UNITED STATES PATENT OFFICE.

GEORG EICHELBAUM, OF BERLIN, GERMANY.

PROCESS OF OBTAINING FOOD EXTRACTS.

SPECIFICATION forming part of Letters Patent No. 708,330, dated September 2, 1902.

Application filed March 28, 1902. Serial No. 100,536. (No specimens.)

*To all whom it may concern:*

Be it known that I, GEORG EICHELBAUM, a subject of the King of Prussia, German Emperor, residing at Berlin, in the Kingdom of Prussia, German Empire, have invented certain new and useful Improvements in Processes of Obtaining Food Extracts; and I do declare the following to be a full, clear, and exact description of the invention, such as will enable others skilled in the art to which it appertains to make and use the same.

The present invention relates to an improved process of producing such food-stuff from milk.

The improved food-stuff possesses the smell and flavor of meat extract and represents, according to the degree of concentration to which it has been subjected, a mass of more or less syrup-like consistency and of a yellow to a yellow-brownish color. The improved food can be dissolved in water, and thereby develops the smell and flavor which is characteristic of meat extract.

The process of producing the improved food-stuff according to the present invention consists in subjecting the albumen contained in milk to a peptonizing process, splitting up the lactose contained in the milk into its glucoses, and fermenting the glucoses thus obtained with yeast. I may effect the peptonization of the albumen contained in milk by one of the fermenting agents which is known to decompose the albumen—for instance, trypsine or pepsine—the experienced workman selecting the ferment according to the special circumstances. It is especially advantageous to use a ferment which effects the peptonization quickly, and I have found trypsine especially well adapted for this purpose. The splitting up of the lactose into its glucoses is effected with diluted mineral acids—for instance, sulfuric acid or hydrochloric acid—by adding such acids in properly-diluted form and heating the same. The choice of the acids to be used, the quantities, the extent of dilution of the same, and the temperature and duration of heating must be determined by the experienced workman. I have found the use of dilute hydrochloric acid very advantageous, because chlorid of sodium is produced from the same in the neutralization with carbonate of sodium, the flavor of the said chlorid of sodium being very pleasing. After the lactose has been split into its glucoses according to the process described the acid is properly neutralized and the glucoses produced from the splitting of the lactose is fermented. The best mode of effecting this is to add pure yeast to the milk in which the lactose is split into its glucoses. A sufficient time is then allowed for the yeast to act. In general I have found three days sufficient for the action of the yeast at a temperature of 30° centigrade; but this time may be varied. An experienced workman will readily determine the quantity of yeast and the length of time required for the action by making experiments. The described peptonization of the albumen is not absolutely necessary, as the process can also be conducted in such a manner that the milk is subjected to the operation of acids in order to effect the splitting of the lactose into its glucoses and that after this splitting has been effected and the acid has been neutralized yeast is added. The yeast then not only operates as a ferment upon the lactose, but has also a peptonizing effect upon the existing albumen. After the lactose has been split, the acid neutralized, and the fermenting of the glucoses has been effected the liquor must be filtered and, if desired, mixed with common salt and boiled down.

My process may be conducted in the following manner: Milk from which the fat has been removed is peptonized in the proper manner—for instance, with trypsine (pancreatin) in ten to fifteen hours at 37° centigrade. This is done by adding per liter of the milk to be used about 0.1 gram of the ferment and about three grams of soda. When the action of the ferment has continued for a sufficient time, the lactose in the milk is inverted by adding acids and heating. Preferably hydrochloric acid is added in such quantity that the total contents of the liquor which is to be inverted corresponds to about one per cent. HCl. The temperature is increased to about 100° centigrade. After the inversion of the lactose is finished the acid is properly neutralized, which is advantageously accomplished with carbonate of sodium. The cooled liquor is then fermented with good common yeast for two days at a temperature of about 30° to 32° centigrade. The cloudy liquor thus obtained is heated to a temperature of about 100° centigrade for the killing of the yeast. It is then filtered one or more times, mixed with common salt to improve the flavor, and is then with the aid of a moderate heat, free or *in vacuo*, brought to the required consistency.

Instead of milk whey may be used; but the yield in the product as compared with that of milk becomes smaller.

The milk may be freed from fat; but milk from which the fat has not been removed may be used.

What I claim, and desire to secure by Letters Patent of the United States, is—

A process for producing a food-stuff similar to meat extract, consisting in mixing milk with a peptonizing ferment and subjecting it to the operation of the said ferment; then mixing therewith diluted mineral acids and heating, and, after the lactose contained in the milk has been split into its glucoses by the action of the acids, neutralizing the acids; then mixing yeast with the liquid to ferment the glucoses obtained from the lactose, and after fermentation is complete, filtering and concentrating the liquid.

In witness whereof I have hereunto signed my name, this 14th day of March, 1902, in the presence of two subscribing witnesses.

GEORG EICHELBAUM.

Witnesses:
 HENRY HASPER,
 WOLDEMAR HAUPT.